(No Model.) 6 Sheets—Sheet 1.

T. M. HOVELL.
ANIMAL TRAP.

No. 426,668. Patented Apr. 29, 1890.

WITNESSES.
Fred White
C. K. Fraser

INVENTOR.
Thomas Mark Hovell,
By his Attorneys
Arthur C. Fraser &Co (No Model.)  6 Sheets—Sheet 2.

T. M. HOVELL.
ANIMAL TRAP.

No. 426,668.   Patented Apr. 29, 1890.

WITNESSES.   INVENTOR.

(No Model.) 6 Sheets—Sheet 4.

T. M. HOVELL.
ANIMAL TRAP.

No. 426,668. Patented Apr. 29, 1890.

WITNESSES.
Fred White
C. K. Fraser

INVENTOR.
Thomas Mark Hovell,
By his Attorneys
Arthur C. Fraser & Co.

(No Model.)  
6 Sheets—Sheet 5.

T. M. HOVELL.
ANIMAL TRAP.

No. 426,668. Patented Apr. 29, 1890.

WITNESSES.  
Fred White  
C. K. Fraser

INVENTOR  
Thomas Mark Hovell,  
By his Attorneys  
Arthur C. Fraser & Co.

(No Model.)  6 Sheets—Sheet 6.

T. M. HOVELL.
ANIMAL TRAP.

No. 426,668. Patented Apr. 29, 1890.

WITNESSES.  INVENTOR.
Fred White  Thomas Mark Hovell,
C. K. Fraser.  By his Attorneys
 Arthur C. Fraser & Co.

UNITED STATES PATENT OFFICE.

THOMAS MARK HOVELL, OF ELSTREE, COUNTY OF HERTS, ENGLAND.

ANIMAL-TRAP.

SPECIFICATION forming part of Letters Patent No. 426,668, dated April 29, 1890.

Application filed July 23, 1889. Serial No. 318,456. (No model.)

*To all whom it may concern:*

Be it known that I, THOMAS MARK HOVELL, a subject of the Queen of Great Britain, residing at Boreham Holt, Elstree, in the county of Herts, England, have invented certain new and useful Improvements in Animal-Traps, of which the following is a specification.

My invention has reference to animal-traps, and more particularly to traps intended to catch rats.

In my improved trap the doors, which when closed form the ends of the trap, are when in the set position held open by means of mechanism connected with a treadle or board which is hinged or pivoted near one of its ends transversely to the run or passage way of the trap, and is balanced by a special counter-weight to the position it maintains while the trap is set. When the weight of a rat or other animal comes upon the treadle this is depressed, and thereby releases the mechanism that holds up the doors. These consequently fall by their own weight, and are then secured or locked in their closed position by the same mechanism that previously supported them.

In carrying out my invention I construct a trap with a bottom and two sides, and for convenience in manufacture prefer to join each half of the top, or a considerable portion thereof, with the corresponding end, so that each end and the corresponding half or portion of the top form one piece, which, when hinged or mounted on a horizontal pivot, can be raised to leave that end of the trap open. In other words, each end, with the corresponding half or portion of the top, forms a door. When the trap is set the ends or doors are held up by means of the mechanism hereinafter described.

Figure 1:
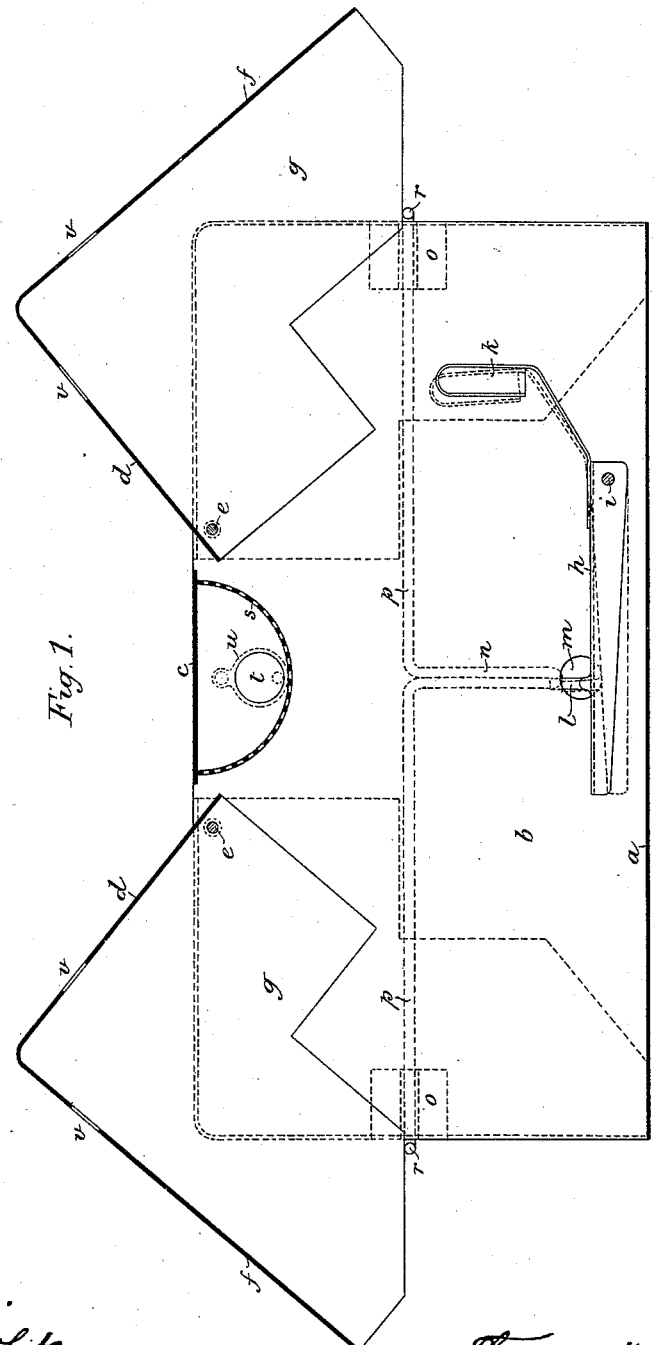
Figure 2:
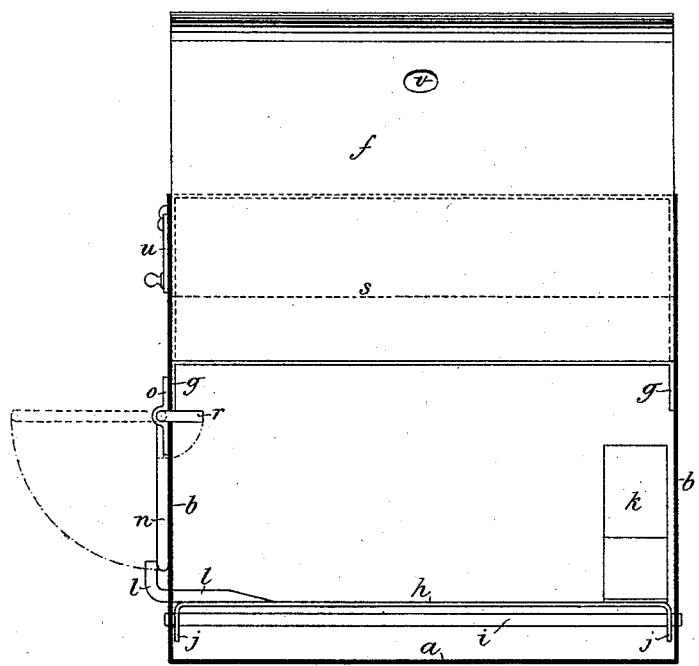
Figure 3:
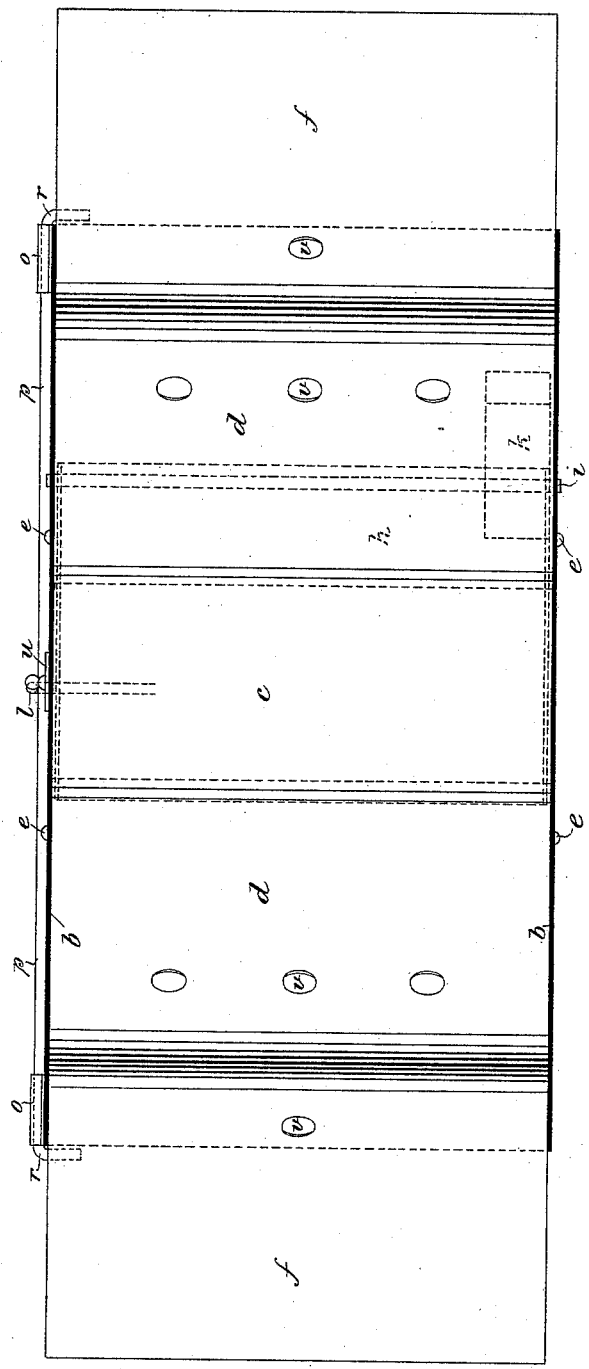
Figure 4:
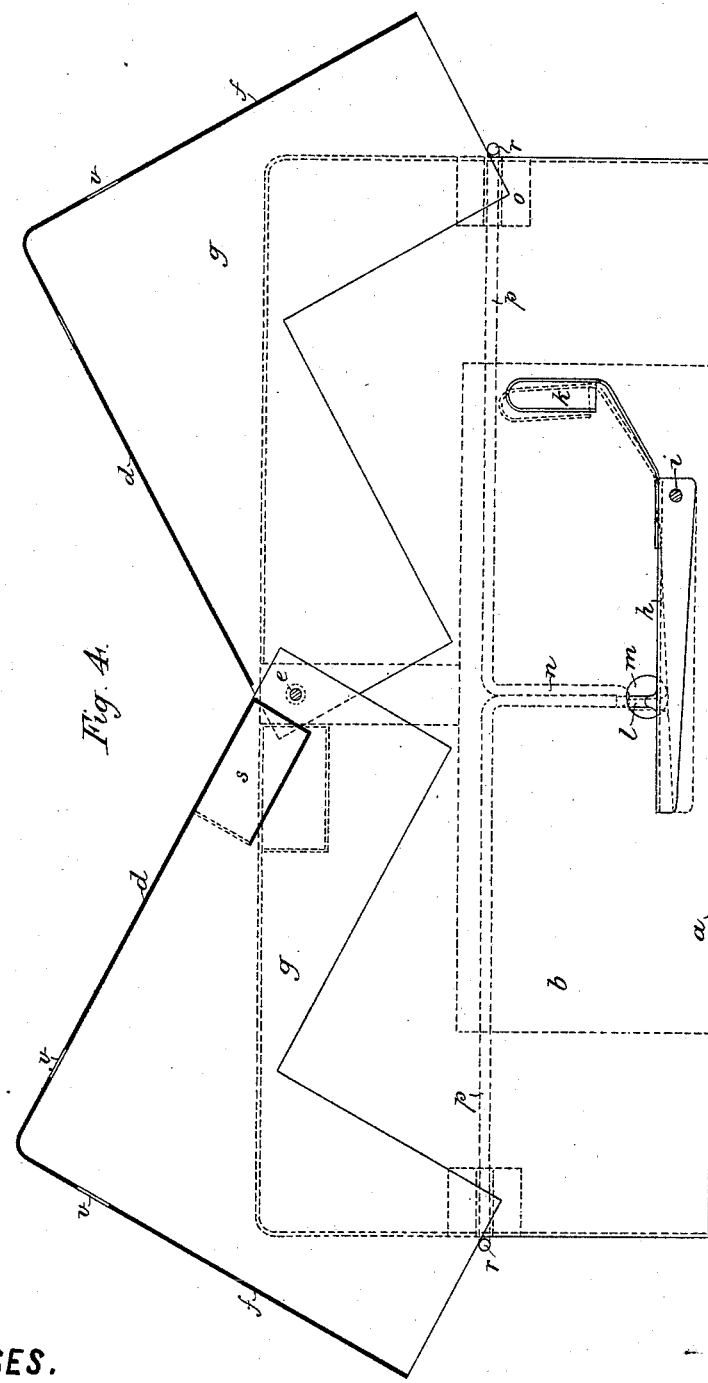
Figure 5:
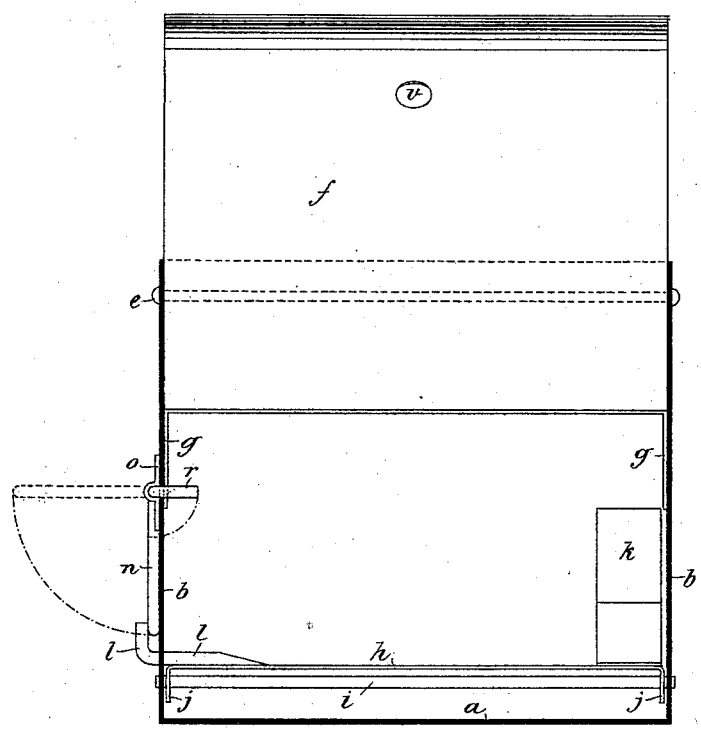
Figure 6:
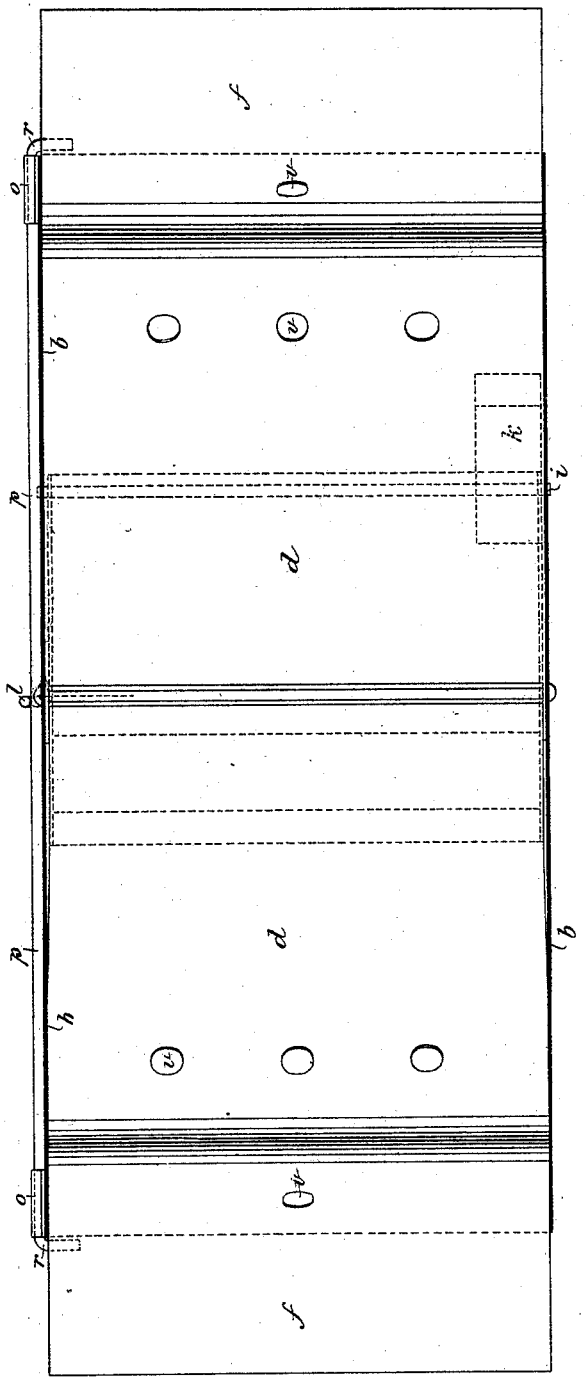

Figure 1 of the accompanying drawings is a longitudinal section, Fig. 2 an end elevation, and Fig. 3 a plan, of a trap constructed in accordance with my invention, each of the two ends being formed in a piece with a considerable portion of the top. Figs. 4, 5, and 6 are similar views of a modification in which each end is formed in a piece with one-half of the top.

The figures show the traps in the open or set positions.

Referring first to the modification represented in Figs. 1, 2, and 3, $a$ is the bottom, and $b\ b$ are the sides, of the trap. These parts may be made of any suitable material; but for economy I prefer to make them of one piece of sheet-iron bent into U form in section. The top is formed of the middle portion $c$, fixed to the sides $b\ b$, and of the two portions $d\ d$, which are pivoted to the sides at $e\ e$. Each of these portions $d\ d$ is formed in a piece with the corresponding end or door $f$. These pieces have sides or cheeks $g\ g$, to enable the doors to be supported.

Across the bottom of the trap is a treadle or board $h$, which moves on a hinge or horizontal pivot $i$, placed, preferably, near its end and extending transversely to the run or passage way of the trap. The treadle $h$ is for cheapness preferably made of a piece of sheet metal with flanges $j\ j$, through which the rod $i$, forming its hinge or pivot, passes. The treadle $h$ has fitted to it a special counter-weight $k$, which balances it in the position it maintains while the trap is set. The treadle and its weight are so proportioned that the treadle is balanced in its normal set position independently of any of the releasing or catching mechanism of the trap. To this treadle is attached a catch $l$, which passes through a hole $m$ in the side $b$ of the trap.

On the outside of the trap is a rod $p$, rather longer than the trap and mounted in horizontal bearings $o\ o$. This rod has an arm $n$, depending at right angles to engage the catch $l$ of the treadle when the trap is set, and at its ends $r\ r$ are bent at a right angle on the same plane as the horizontal portion $p$, in order to support the doors $f$ when they are in the raised position, as seen in the figures. The weight of the doors pressing on the horizontal bent ends $r\ r$ of the rod tends to force these ends down, and therefore to turn the rod on its axis; but such turning is prevented by the catch $l$. When, however, a rat enters the trap and its weight depresses the treadle $h$ to the position indicated in dotted lines in Fig. 1, the catch $l$ is lowered, and thereby releases the arm $n$, the result of which is that the weight of the doors $f$, pressing on the horizontal bent ends $r$ of the rod $p$, causes them to be depressed and turned out of the way of the falling doors and the rod $p$ to be turned axially in its bearings $o$ until the trap is closed. As the arm *n* is on a plane at right angles to the ends *r* of the rod, it is raised to a horizontal position, as shown in dotted lines in Figs. 2 and 5, when they are depressed to a vertical position by the falling doors. As, however, the arm *n* is heavier than the bent ends *r*, it falls by its own weight to the vertical position as soon as the doors have closed, and thus turns the rod *p* on its axis and brings up its bent ends *r* to the horizontal position. The rod *p* being longer than the trap, the bent ends *r* are now outside the closed doors *f*, which, being hinged at *e*, cannot be raised without passing beyond the end of the trap. This movement of the doors being prevented by the bent ends *r*, the doors are securely locked. If necessary, the arm *n* can be weighted to insure the return of the bent ends *r* to the horizontal position. The closed position of the doors is indicated by dotted lines in Figs. 1 and 4.

The bait may be placed in a receptacle in the top of the trap in such a position that the rat in endeavoring to reach it will tread upon and depress the treadle *h*. This receptacle, in the modification shown in Figs. 1, 2, and 3, is a perforated holder *s*, fixed to the middle portion *c* of the top. It can be filled with grain or other bait through a hole *t* in the side *b*, this hole being normally covered by a flap or escutcheon *u*.

*v v* are sight and air holes in the top and ends of the trap.

The modification shown in Figs. 4, 5, and 6 will be understood without further description. The same letters of reference as those in Figs. 1, 2, and 3 indicate corresponding parts.

Although I prefer to construct the trap with a door at each end, so that when the trap is set it presents what is apparently a clear run for the rat, which is therefore not deterred from entering, as is often the case with traps which have only one opening, the trap may be constructed with one end closed and with the other fitted with a door arranged and acting in the manner hereinbefore described.

What I claim, and desire to secure by Letters Patent, is—

1. In a box-trap, a weighted treadle or board pivoted within the trap and having a catch near its free end, in combination with a door at the end of the trap and adapted to close by its own weight, and with holding and releasing mechanism for said door pivoted to the trap on an axis at right angles to the axis of said treadle and above said catch, and constructed with an end for holding up said door and having an arm projecting into engagement with said catch constructed to move laterally to said treadle, said mechanism adapted to be released by the downward movement of said treadle or board and normally holding the door open, substantially as described, whereby when the trap is set the tendency to close does not affect the position of the treadle, and when the treadle is depressed by the weight of a rat or other animal the door is released and closed, as set forth.

2. In a box-trap the combination, with a treadle or board within the trap, adapted to be depressed by the weight of an animal entering the trap, and with a door at the end of the trap, of releasing mechanism adapted to normally hold the door open and to act as a lock for holding the door closed after the latter has fallen, substantially as set forth.

3. In a box-trap, the combination, with a weighted treadle or board within the trap and with a door at the end of the trap and adapted to close of its own weight, of a catch *l*, attached to said treadle, and a rod *p*, mounted in bearings, and having an arm *n*, to engage said catch, and a bent end or hook *r*, to hold up said door, substantially as described, whereby when the treadle is depressed the catch *l* frees the arm *n* and allows the rod *p*, with its bent end *r*, to turn axially and release the door, as set forth.

In witness whereof I have hereunto signed my name in the presence of two subscribing witnesses.

THOMAS MARK HOVELL.

Witnesses:
 GEORGE C. BACON,
 THOMAS L. WHITEHEAD.